Oct. 20, 1931.　　　D. CONLAN　　　1,827,732
MOTOR VEHICLE LOCK
Filed Aug. 6, 1929　　　3 Sheets-Sheet 1
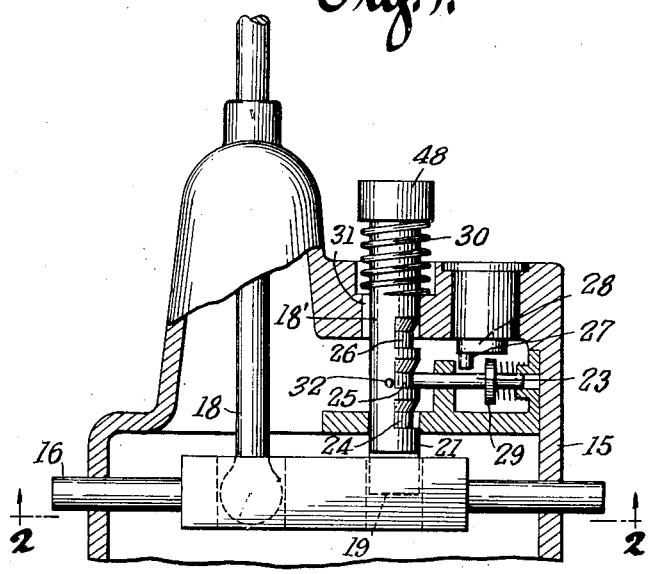
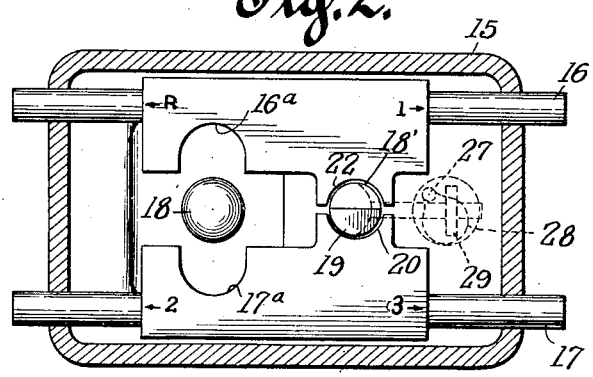
David Conlan
INVENTOR
BY Philip S. McKean
ATTORNEY

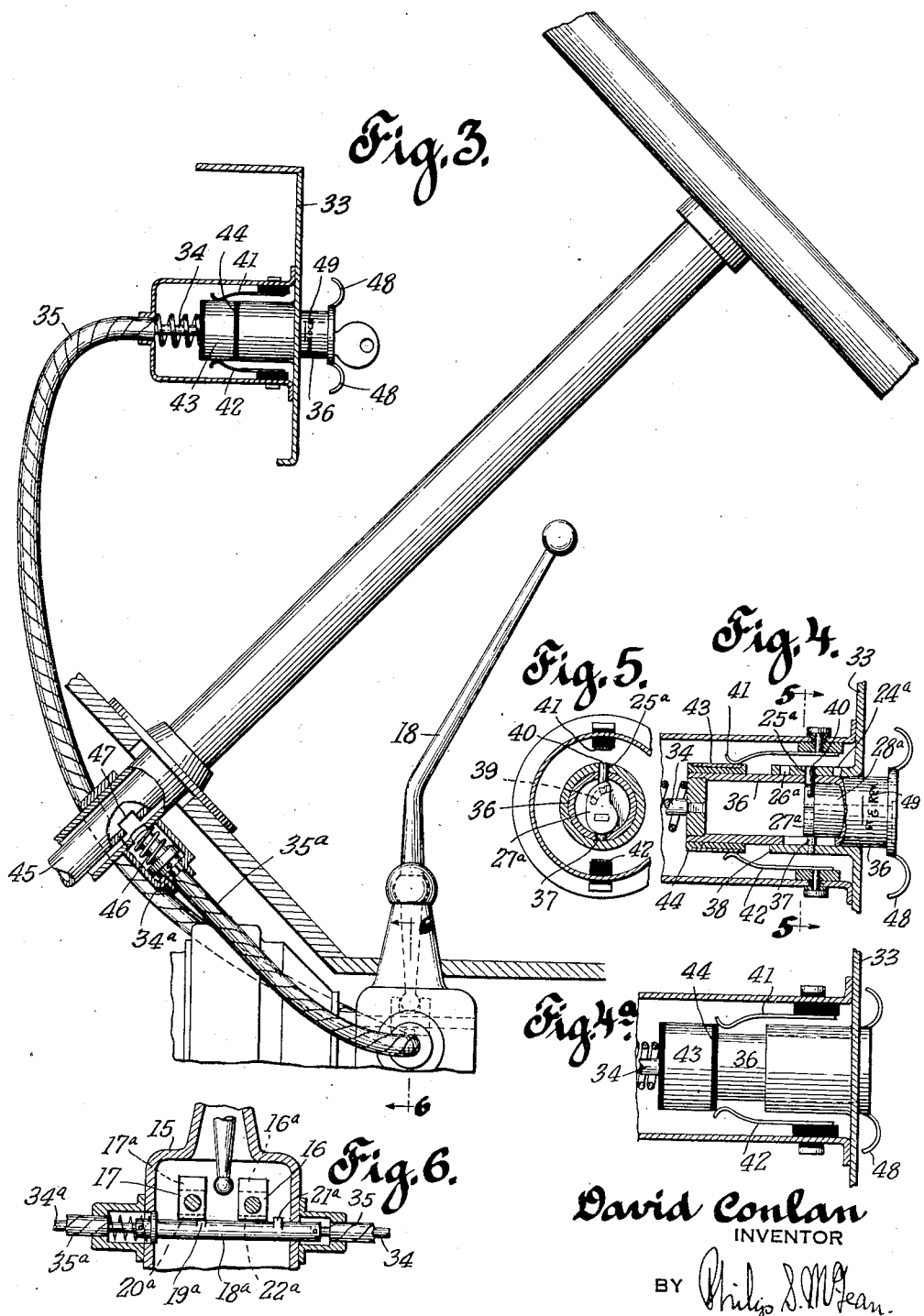

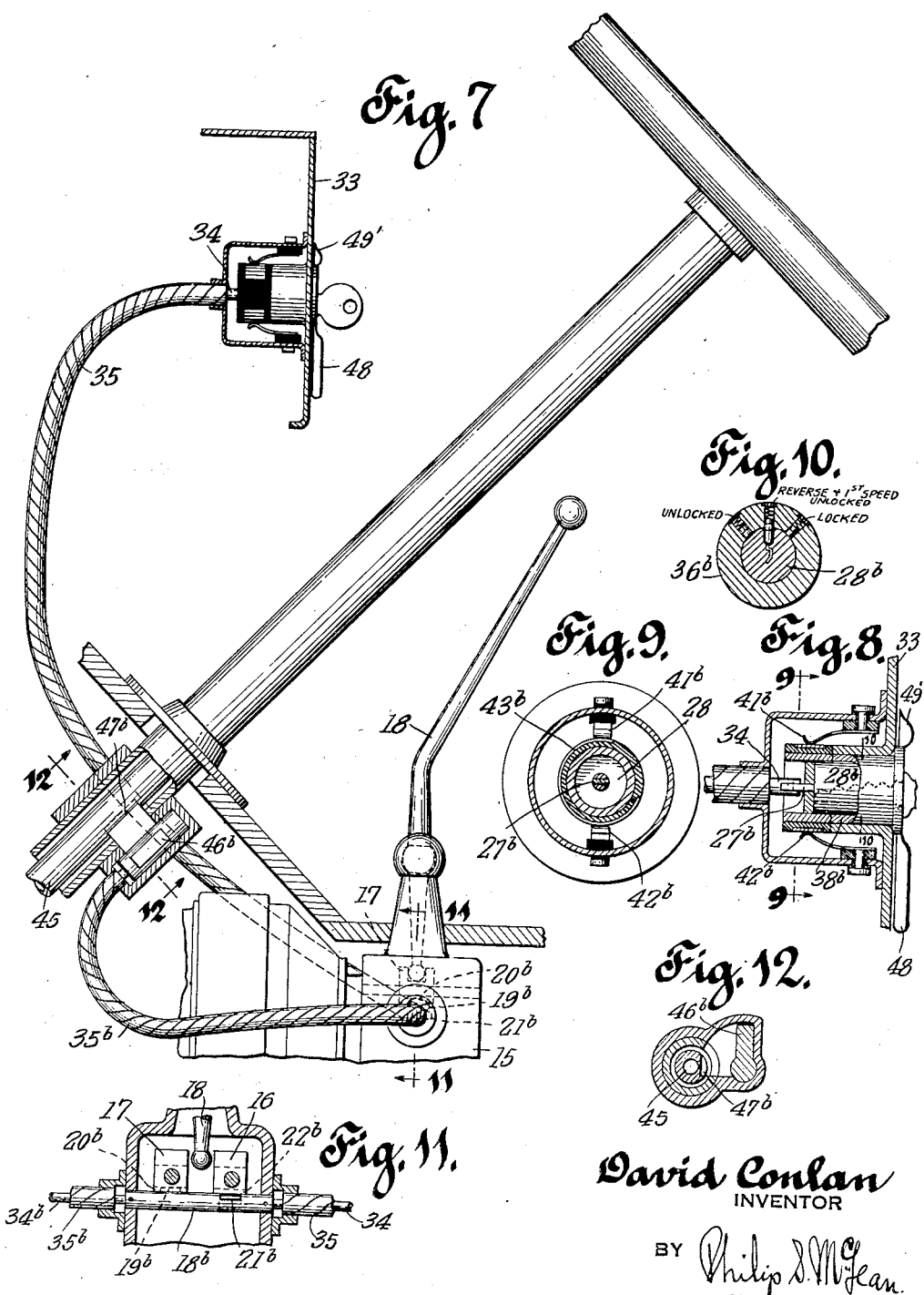

Patented Oct. 20, 1931

1,827,732

UNITED STATES PATENT OFFICE

DAVID CONLAN, OF BROOKLYN, NEW YORK

MOTOR VEHICLE LOCK

Application filed August 6, 1929. Serial No. 383,927.

The present invention is a continuation in part of application, Ser. No. 263,565, which application issued as Patent 1,737,043 of November 26, 1929.

Special objects of the invention are to provide practical reliable means for locking a vehicle against any use, and which may also be employed to secure the vehicle against any other than a predetermined limited use.

Further objects are to provide locking apparatus readily applicable to existing motor vehicles, which can be conveniently operated and which may be utilized, for example, to secure a motor car so that it may be operated only in first speed and reverse, as for storing in a public garage or be locked against any use, as when parked in the street. Various other objects and the novel features of construction, combinations and relations of parts constituting the invention will appear as the specification proceeds.

Fig. 1 is a broken side elevation partly in vertical section showing a form of the double lock incorporated in and combined with the transmission shift mechanism; Fig. 2 is a bottom plan view of the same as taken on substantially the plane of line 2—2 of Fig. 1; Fig. 3 is a view of a modification illustrating the locking bolt as actuated from a push type of lock on the dash or instrument panel and constructed to control the motor ignition circuit and steering column coincidentally with the transmission; Fig. 4 is an enlarged broken sectional detail of the lock cylinder shown in Fig. 3; Fig. 4ª is a similar detail showing the lock cylinder shifted inward from the position indicated in Fig. 4 to the fully locked condition in which the ignition circuit is broken; Fig. 5 is a cross-sectional broken detail as on substantially the plane of line 5—5 of Fig. 4; Fig. 6 is a cross-sectional broken detail of the transmission with the parts as they would be in the condition of the lock shown in Fig. 4, that is with one, the left hand, shifter slide locked against movement and the other slide free to operate; Fig. 7 is a broken part sectional view similar to Fig. 3 showing a coincidental form of the lock in which the locking and unlocking actions are effected by a turning movement of the control cable instead of the push movement shown in Fig. 3; Figs. 8, 9 and 10 are sectional details of the latter form of lock; Figs. 9 and 10 respectively being taken substantially on lines 9—9, 10—10 of Fig. 8; Fig. 11 is a broken cross-sectional detail illustrating the successive selective locking of the two shifters or slides in this form of the invention; Fig. 12 is a detail sectional view of the steering shaft lock as on substantially the plane of 12—12 of Fig. 7.

In the several forms of the invention disclosed herein, the locking is effected by securing the slides of the transmission gearing. In the several views, a gear case of conventional design is indicated at 15 having shifter slides 16, 17, operating therein and actuated by the rocking gear shift lever 18, the first slide controlling shifting of the transmission gears to low speed and reverse drive conditions and the second slide controlling shifting of the gears to second and third or high speed driving conditions.

The locking of the two gear slides is controlled by a bolt 18' operating down through the top of the gear case and having at its lower end a half round portion 19 to engage in a corresponding recess 20 in the second and third speed gear shift 17, in the partially depressed condition shown in Fig. 1 and a full round portion 21 above said half round part to interlock with both recess 20 and with recess 22 in the first and reverse shifter 16 when the bolt is fully depressed.

To secure the locking bolt in either of the locking positions described, a spring pressed pin or bolt 23 is provided in the illustration adapted to enter into any one of the three notches 24, 25, 26, in the side of the locking bolt. The dogging pin 23 is shown as retracted by a roll-back 27 on the lower end of a pin tumbler locking cylinder 28 set in the top of the gear case, said roll-back engaging a collar or shoulder 29 on the dogging pin. A spring 30 surrounding the locking bolt operates to retract this bolt when it is released through the operation of the pin tumbler lock and said bolt is indicated as held against turning by a key or feather 31 and as limited in its outward movement by a transverse pin or key 32.

The seats 24, 25, 26 in the forward side of the locking bolt are indicated as bevelled at their upper edges to enable the bolt to be forced down by hand or foot pressure, but the lower edges of these recesses are abrupt where engaged by the dogging pin, so that the bolt can be released only by the retraction of this pin through the turning of the key in the lock.

It will be seen from the description thus far that if it is desired to fully lock the transmission, the bolt will be fully depressed, while the gear shifters are in the neutral position shown in Figs. 1 and 2, so as to carry the full round portion 21 of the bolt down into the opposing recesses 20, 22 in the gear shift slides. If, however, it is desired to lock the car against operation in second or third speed, leaving it free to be operated in the first or reverse, then the locking bolt or plunger is pressed down only part way to the position indicated in Fig. 1, where the lower half round portion 19 of the bolt enters the locking recess 20 in the second and third speed slide 17. Under these conditions, the first and reverse speed slide may still be shifted, so that the car may be operated either in reverse or first speed, but can not be operated under power in second or third speed. Either in the fully locked condition, or in the partially locked condition described, the parts are so secured until the locking bolt is released by turning of the pin tumbler lock with a properly fitting key provided for the purpose.

The lock is well adapted to so-called "dash control" operation as illustrated in Figs. 3 and 7, which show how the key actuated pin cylinder may be mounted in the dash or instrument panel 33 and be connected with the transmission locking element by a flexible chain or cable form of connection 34 operating through a conduit 35. These illustrations show furthermore how the lock may be utilized to control the motor ignition circuit and the steering shaft.

In Fig. 3, the lock has a push-pull operation whereas in the Fig. 7 construction the action is a partial rotary or turning movement. The Fig. 3 construction is thus quite similar to the sliding bolt of Fig. 1 plus a remote control for operating and securing the locking bolt.

Figs. 4 and 5 are detail views showing how the pin cylinder 28a of the Fig. 3 construction is mounted rotatably in a shell 36 slidingly guided by the pin and slot construction 37 in a fixed housing 38 and connected at the inner end with the flexible cable, wire, or shaft 34. The roll-back 27a on the key plug operates through a cam connection at 39 to retract pin 40, which projects through the sliding shell 36 and is selectively engageable in the locking notches or openings 25a, 26a, in the fixed casing 38.

In the position illustrated in Fig. 4, the lock is set in the first locking position, that is to secure the second and third speed gear shift slide 17 and to leave the first and reverse gear shifter 16 free for operation. This condition is illustrated in Fig. 6, where it will be seen that the transversely sliding locking bolt 18a has been shifted inward across the gear case to carry a lug 19a thereon into a slot 20a in the second and third speed gear shifter 17. A second lug 21a on the locking bolt 18a will be carried upon a further inward movement of the bolt into a locking recess 22a in the first and reverse gear shifter 16, but in the position shown, this second locking lug is free of the shifter 16 and consequently the car may be operated in first or reverse, while secured against operation in second or third speed.

The ignition circuit of the motor is brought under control of the lock mechanism as shown in Figs. 3 and 4 by providing the contacts 41, 42 interposed in the ignition circuit and adapted to bear upon a conductor ring 43 on the lock barrel 36, when said lock is in either the outer free running position shown in Fig. 3 or in the partly locked position shown in Fig. 4. This bridging contact 43 is shown carried by an insulating ring 44, which in the inner fully locked position of the parts comes in engagement with the circuit contacts 41, 42, to positively break the ignition circuit. Thus, the motor can be operated, under control of a suitable ignition switch, while the car is locked against use in second or third speed and, when the locking barrel is shifted all the way in, can not be operated, when both gear shifters are locked against use.

As a further precaution, the steering shaft 45 may be simultaneously locked in the second or final locked condition as by means of a bolt shown at 46 in Fig. 3, designed to be forced into a locking seat 47 in the steering shaft by a flexible connection 34a operating in a conduit 35a and connected to the end of the locking bolt 18a, Fig. 6, opposite that end to which the flexible connection 34 is connected. It will be observed in Fig. 3 that in the fully unlocked condition of the parts and in the partially locked condition, the bolt 46 will be free of the locking recess 47 in the steering shaft, but that in the fully locked condition, this bolt will have entered the locking recess 47, so as to secure the steering mechanism against operation when the transmission is fully locked and the ignition circuit is cut off.

While the key may be used for shifting the locking barrel 36 in and out, said barrel may have handle means such as indicated at 48, which may be grasped to shift the barrel in and out when the key has been turned to unlock it. Also suitable marks or indications may be provided as indicated at 49 to show at a glance the position or condition of the locking mechanism.

In the partial rotary type of mechanism illustrated in Figs. 7 to 2, the key plug 28b has a rotary movement in the lock casing 38b and has a roll-back 27b connected to turn the flexible cable 34.

The transmission locking bolt 18b, Figs. 7 and 11, in this construction, has a first locking lug 19b to enter locking recess 20b in the second and third speed shifter 17 and a second circumferentially displaced locking lug 21b, which will be carried, by the second rotative locking movement of the bolt into interlocking relation with a recess 22b in the first and reverse gear shifter 16.

In this construction, the ignition circuit remains completed by contact 43b on the key plug, while the lock is in the unlocked or first locking position as indicated particularly in Fig. 9, but upon turning the key plug to the final locking position, this contact will be carried out of engagement with the upper circuit contact 41b and the ignition circuit be thereupon broken.

The steering shaft in this case is locked by an extension 34b of the rotary locking bolt 18b, which operates in the final or fully locked position of the parts to turn a lug 46b into a locking recess 47b, Fig. 12 of the steering shaft.

The key plug in this case also is shown equipped with a handle member designated 48, which may be utilized to impart a turning movement to the key plug and an indicator in the form of a pointer is shown at 49 for showing at a glance the position of the locking mechanism, for instance, by registering with markings, such as illustrated in Fig. 10 placed on the face of the dash or instrument panel.

In the several views, the shift lever is indicated in the so-called neutral position, ready for rocking to one side, or the other, to engage with the shifting sockets 16a, 17a in the gear shift slides, it being evident that when thus engaged the lever may then be rocked forwardly or backwardly to shift the slide with which it is engaged and thus effect the meshing or driving relation of the selected gears. In the first form of the invention, the locking bolt may be shifted independently of the key operation by means of the head or handle designated 48 and correspondingly in its use to the similarly numbered handles in the Fig. 3 and Fig. 7 forms of the invention. The key then is necessary only to release the lock structure after which the bolt may be manually shifted without straining the key mechanism.

What is claimed is:

1. In combination with a variable speed motor transmission, including gear shifters arranged in side by side relation in substantially the same horizontal plane, one of said shifters controlling the reverse and first speed and the other shifter controlling the second and third speed, means for selectively operating said shifters, a locking bolt for said shifters having one unlocking position to free both shifters and two locking positions, one locking position in which the bolt engages and secures one gear shifter, while leaving the other gear shifter free for operation and a second locking position in which said locking bolt engages and secures both gear shifters, and three position key actuated locking means for releasing or for securing the bolt in either of the two locking positions, said key actuated lock being located at a remote point relative to the transmission locking bolt and having a flexible operating connection with said transmission locking bolt by which said bolt may be controlled from said remote point either to fully lock or to fully unlock the transmission or to leave only one gear shifter free for operation.

2. In combination with a motor vehicle transmission, including gear shifters and a shift lever operable to selectively engage and actuate either of said gear shifters, said gear shifters comprising slides operating side by side in substantially the same horizontal plane, said slides having locking recesses arranged to stand substantially in transverse alignment when said gear shifters occupy a neutral position, a bolt having part and full locking portions and shiftable from a position clear of both shifters into a position with the part locking portion in interlocking engagement with only one of the shifters and shiftable further to bring the full locking portion into interlocking engagement in the recesses in both of the gear shifters and a three position key actuating locking means for securing the bolt in the free position or for locking the bolt in either of the two locking positions described.

3. In combination with a motor vehicle, having a control circuit and a variable speed transmission, switch means for said control circuit, said variable speed transmission having reverse and three forward speeds, a lock having one unlocking and two locking positions, gear shift locking mechanism controlled by said lock adapted in the unlocking position of the lock to permit free shifting of the gears and in one of the locking positions to lock the second and high speed gearing, while leaving the low speed and reverse gearing free for use, and in the other locking position to lock the reverse and all forward speeds, said switch mechanism including a movable element connected with the lock mechanism and operable thereby to render the control circuit operative while the locking mechanism is in the unlocked or in the first locking position and to render the control circuit inoperative when the locking mechanism is in the second fully locked condition.

4. In combination with a motor vehicle, having a control circuit and a variable speed transmission, switch means for said control circuit, said variable speed transmission having reverse and three forward speeds, a lock having one unlocking and two locking positions, gear shift locking mechanism controlled by said lock adapted in the unlocking position of the lock to permit free shifting of the gears and in one of the locking positions to lock the second and high speed gearing, while leaving the low speed and reverse gearing free for use, and in the other locking position to lock the reverse and all forward speeds, said switch mechanism including a movable element connected with the lock mechanism and operable thereby to render the control circuit operative while the locking mechanism is in the unlocked or in the first locking position and to render the control circuit inoperative when the locking mechanism is in the second fully locked condition, said motor vehicle further having steering means and a locking device for said steering means and connected with the locking mechanism aforesaid to be actuated to lock the steering mechanism only when the parts are in the fully locked position described.

5. In combination with a motor vehicle, having steering mechanism and a variable speed transmission, said transmission having reverse and three forward speeds, a lock having one unlocking and two locking positions, gear shift locking mechanism controlled by said lock and operable in the unlocking position of the lock to permit free shifting of the gears and in one of the locking positions to lock the second and high speed gearing, while leaving the low and reverse speed gearing free for use and in the other locking position to lock the reverse and all forward speeds mentioned and lock means for the steering mechanism connected with said transmission locking mechanism and operable thereby to leave the steering mechanism free in the unlocked and in the first locking position, but to secure said steering mechanism in the second fully locking position aforesaid.

6. In combination with a motor vehicle, having steering mechanism and a variable speed transmission, said transmission having reverse and three forward speeds, a lock having one unlocking and two locking positions, gear shift locking mechanism controlled by said lock and operable in the unlocking position of the lock to permit free shifting of the gears and in one of the locking positions to lock the second and high speed gearing, while leaving the low and reverse speed gearing free for use, and in the other locking position to lock the reverse and all forward speeds mentioned and lock means for the steering mechanism connected with said transmission locking mechanism and operable thereby to leave the steering mechanism free in the unlocked and in the first locking position but to secure said steering mechanism in the second fully locking position aforesaid and a motor ignition switch including a movable switch part actuated by the locking mechanism and shiftable thereby to interrupt the ignition circuit in the final locking position of the locking mechanism, but to complete the ignition circuit in the unlocking position or in the first locking position aforesaid.

7. In combination with a motor vehicle, having a dash and a variable speed transmission with reverse and three forward speeds, a three position key actuated lock mounted on the dash, a mechanical power connection extending from said key lock on the dash to the transmission, said key lock having two locking positions and an unlocking position and locking mechanism at the transmission and operated by the mechanical connection from the key lock on the dash to secure the transmission in one locking position against use of the second and third speed and to secure the transmission in the second locking position against use of reverse and all forward speeds mentioned and in the unlocking position to permit use of reverse and all forward speeds mentioned.

8. In combination with a motor vehicle, having a dash and a variable speed transmission with reverse and three forward speeds, a key actuated lock mounted on the dash, a mechanical power connection extending from said key lock on the dash to the transmission, said key lock having two locking positions and an unlocking position and locking mechanism at the transmission and operated by the mechanical connection from the key lock on the dash to secure the transmission in one locking position against use of the second and third speed and to secure the transmission in the second locking position against use of reverse and all forward speeds mentioned and in the unlocking position to permit use of reverse and all forward speeds mentioned and switch mechanism incorporated with the lock on the dash to complete a circuit in the unlocking and in the first locking position and to break said circuit in the second locking position.

In testimony whereof I affix my signature.

DAVID CONLAN.